United States Patent Office 2,978,238
Patented Apr. 4, 1961

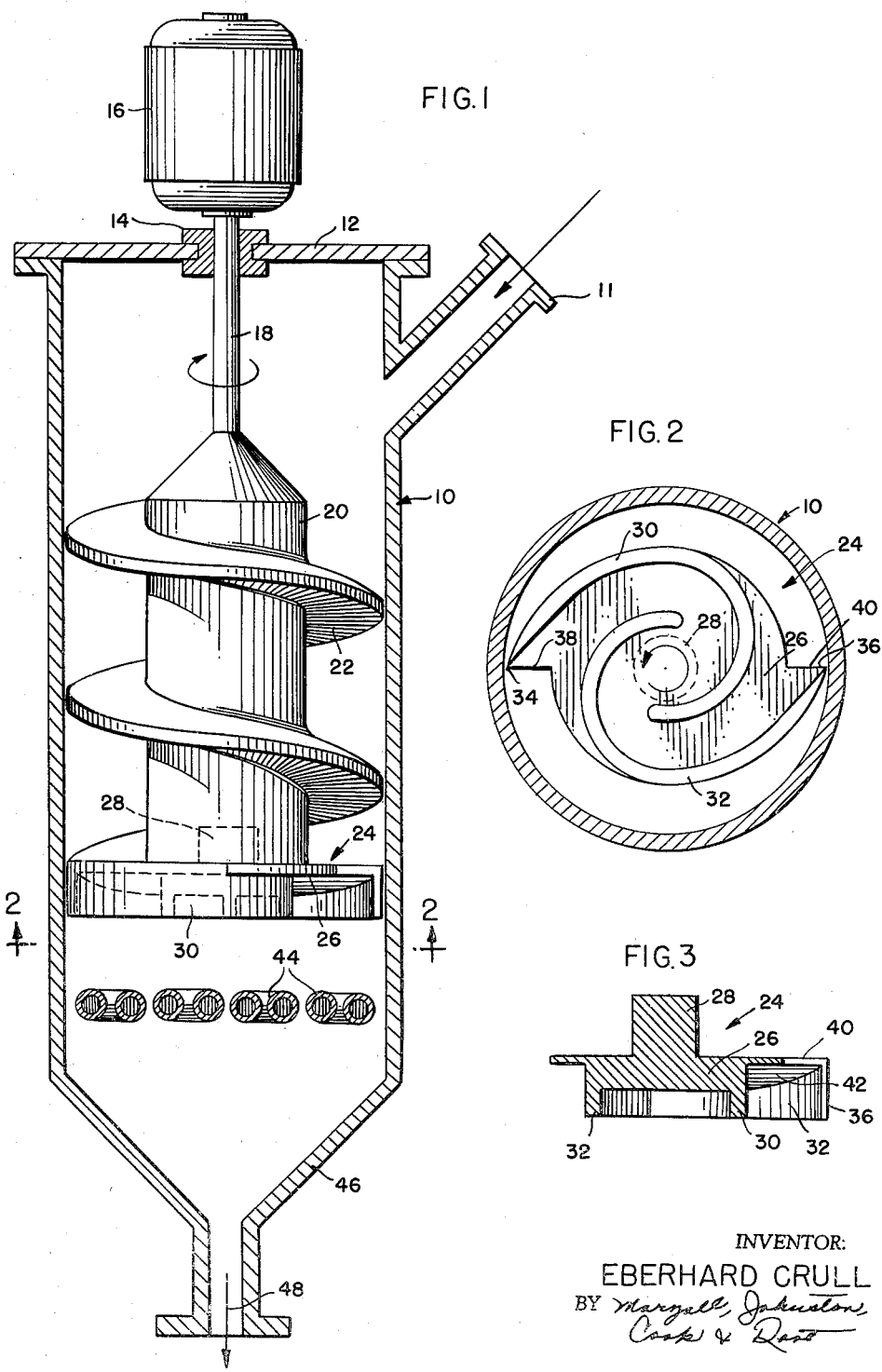

2,978,238
SCREW CONVEYOR AND APPARATUS FOR MELTING SYNTHETIC POLYMER PARTICLES

Eberhard Crull, Obernburg (Main), Germany, assignor to Vereinigte Glanzstoff-Fabriken AG., Wuppertal-Elberfeld, Germany Filed Dec. 20, 1957, Ser. No. 704,168

Claims priority, application Germany Dec. 24, 1956

7 Claims. (Cl. 263—7)

This invention, in general, relates to heating apparatus for melting synthetic polymers for manufacture into artificial threads and foils, and also to improvements in screw conveyors especially adapted for conveying the synthetic polymer particles in said heating apparatus.

In the manufacture of artificial threads or foils from synthetic polymers, such as polyamides of the nylon type, the polymers are shredded or cut into small particles. These particles are then heated above their melting point and extruded in the form of filaments or foils. It is common practice to convey the particles across a heating grate composed of tubing containing a heating fluid. The conveying of the polymer particles over the heating grate is complicated by the tendency of the polymers to become tacky on their surfaces as they flow toward the heating grate as a result of the heat emitted by the heating grate. This tackiness creates a tendency in the particles to form bridge-like obstructions which hinder the orderly, uniform flow of the particles across the heating grate. To overcome this difficulty, it has been the practice to convey the polymer particles over the heating grate by use of pressure screws or pressure worms in the heating apparatus. By such employment of pressure screws or pressure worms, the performance of the heating apparatus was considerably improved.

The improvements provided by the employment of pressure screws in the heating apparatus, however, did not result in the utmost efficient use of the heating grate in that the major flow pattern of the material across the heating grate was largely limited to an area in the form of a hollow cylinder. This apparently is due to the nature of the design of the screw conveyor which comprises a rotating shaft or core having helical flights or vanes whose effective pressure area takes the shape of an annular ring about the shaft or core of the screw conveyor. Hence, the pressure applied by the screw conveyor at the discharge end thereof, is largely limited to the annular area previously described. The inner area of the particles at the discharge end of the screw conveyor, situated in the area defined by the forward projection of the shaft or core of the screw conveyor, has considerably less particle movement than the annular area previously described so that in this inner area the heating grates are not utilized efficiently. In accordance with the present invention, the inner areas of the heating grate are utilized to better efficiency by the improvement of means to improve the flow characteristics of particles at the discharge end of the conveyor in the inner or center area previously discussed. These improvements are brought about by the use of flow directing or guide surfaces which shift a portion of the particles discharged by the screw conveyor into the center of the heating apparatus, the area defined by the forward projection of the screw conveyor core or shaft. In a preferred embodiment of the invention, the guide surfaces take a spiral form and are mounted in a manner so as to be rotated. By this arrangement, a more or less strong spiral forward movement is imparted to the material as it moves across the heating grate—thereby providing better contact between the particles and the heating grate and consequently a more favorable efficiency in the melting action of the heating grates upon the polymer particles.

A design which has proved to be especially advantageous is one in which the guide surfaces are in the form of plane spirals situated at the discharge end of the screw conveyor and mounted to rotate with the screw conveyor. This embodiment of the invention is more particularly described hereinafter in conjunction with the drawings wherein:

Fig. 1 is a cross-sectional view of a heating apparatus for melting synthetic polymer particles;

Fig. 2 is a transverse cross-sectional view of the heating apparatus taken along the lines 2—2 of Fig. 1; and Fig. 3 is a diametric cross-section of the rotating member for conveying a portion of the particles discharged by the screw conveyor in an inward direction.

Referring to the drawing, the cylindrical heating vessel 10 has an angularly disposed feed conduit 11 through which the synthetic polymer particles are fed by gravitational flow or other suitable means to the cylindrical passage of the vessel 10. The vessel 10 is provided with a cover 12 having a bearing 14 for the screw conveyor shaft 18, which is driven by the electric motor 16. The shaft 18 has an enlarged core 20 to which are fixed the helical flights or vanes 22 of the screw conveyor.

At the discharge end of the screw conveyor there is provided a rotating member, designated generally at 24, for directing a portion of the particle flow at the discharge end of the screw conveyor toward the center of the heating vessel 10 into the area defined by the forward projection of the core 20 of the screw conveyor. The member 24 comprises a base 26 having a lug 28 which is fitted into a corresponding aperture in the core 20 of the screw conveyor and secured therein by any suitable fastening means such as welding, threaded bolts, or the like. The base member 26 has depending therefrom a pair of spiraliform vanes or guide surfaces 30 and 32 with leading edges 34 and 36, respectively. The spiraliform vanes 30 and 32 provide a spiral impelling surface which is substantialy parallel with the axis of the screw conveyor, thereby giving an inward motion to a portion of the particles discharged by the screw conveyor. Thus, the member 26 is fixed to and rotatable with the screw conveyor and has a displacement area, transverse to the axis of the screw conveyor, occupying substantially less than the cross-sectional area defined by the flights 22 of the screw conveyor. This design permits the particles impelled by the screw conveyor to pass beyond the base member 26, whereupon a portion of the particles below the entry edges 38 and 40 of the base member 26 are forced by the rotational movement of the spiral vanes 30 and 32 in an inward direction. In the embodiment illustrated, the spiral vanes may be described as being in the form of plane spirals which begin at a point near the central axis of the cylindrical housing for the screw conveyor and terminate substantially transversely coextensive with the outermost edges of the helical flights of the screw conveyor. This design of the spiral vanes has proven to be particularly effective in imparting a spiral motion to the particles. It will be understood, however, that the construction of the vanes in the form of a plane spiral constitutes only one embodiment of means for directing the particle flow at the discharge end of the screw conveyor in an inward direction.

A portion of the lower surface of the member 26 adjacent the spiral vanes 30 and 32, proceeding from the outer edge of the member 26 toward the center thereof, is inclined with respect to a transverse plane in the forward direction of movement of particles to the heating apparatus—thereby providing forward impelling surfaces on the side of the member 26 remote from the screw conveyor. These inclined planes 42, having a pitch of the same hand as the pitch of the flights 22 of the screw conveyor, impart a forward movement to the particles conveyed toward the center of the apparatus in addition to the forward impetus provided by the motion of the flights 22 of the screw conveyor.

Thus, the polymer particles are conveyed at a relatively uniform rate of flow throughout the heating apparatus across a heating grate 44 disposed transversely across the passage of the vessel 10. The heating grate 44 comprises a convoluted hollow tube or piping through which a heating fluid is pumped. The polymer particles are melted in the zone surrounding the heating grate and the molten polymer then passes downwardly through the tapered section 46 of the heating vessel 10 into the discharge opening 48 and is forced by suitable pumping apparatus to spinnerettes or extrusion nozzles, from which the molten polymer is extruded in the form of filaments or foils, as the case may be.

While the foregoing comprises a preferred embodiment of the invention, it will be understood that other modifications and variations of the invention herein taught can be made without departing from the spirit and scope of the invention herein described and claimed.

The invention is hereby claimed as follows:

1. In apparatus for melting synthetic polymers, a vessel forming a cylindrical passage, screw conveyor means within said cylindrical passage for conveying particles longitudinally through said passage, heating means disposed transversely across said passage on the discharge side of said screw conveyor, and positioned at the discharge end of said screw conveyor, means having a rotatable impelling surface for imparting movement to a portion of the particles discharged by said screw conveyor toward the center of said vessel and another rotatable impelling surface for simultaneously imparting a forward motion to said portion of the particles.

2. In apparatus for melting synthetic polymers, a vessel forming a cylindrical passage, screw conveyor means within said cylindrical passage for conveying particles longitudinally through said passage, a heating grate disposed transversely across said passage on the discharge side of said screw conveyor, and positioned at the discharge end of said screw conveyor, means having a rotatable impelling surface for imparting movement to a portion of the particles discharged by said screw conveyor toward the center of said vessel, and another rotatable impelling surface for simultaneously imparting a forward motion to said portion of the particles.

3. In apparatus for melting synthetic polymers, a vessel, screw conveyor means within said vessel for conveying particles longitudinally through said vessel, heating means in said vessel on the discharge side of said screw conveyor, and at least one spiral vane having a spiral impelling surface substantialy parallel with the axis of said screw conveyor and being operatively associated with said screw conveyor for rotation therewith, said spiral vane beginning at a position adjacent the center of said heating vessel and terminating at a point substantially transversely coextensive with the outer edge of said screw conveyor.

4. The apparatus of claim 3 wherein said spiral vane is operatively associated with said screw conveyor by a member having an inclined surface adjacent said spiral vane, said surface being inclined in the direction of movement of particles through said apparatus from the outer edge of said member toward the center thereof whereby said member imparts a forward movement to the particles conveyed toward the center of said apparatus by said spiral vanes.

5. A conveying apparatus comprising a cylindrical housing, a screw conveyor having a helical flight mounted longitudinally in said housing for rotational movement therein, and a pair of spiraliform vanes having spiral impelling surfaces substantially parallel with the axis of the screw conveyor and fixed to the discharge end of said screw conveyor for rotational movement therewith, the spiraliform vanes beginning at diametrically opposed points near the center of said housing and terminating at diametrically opposed points substantially coextensive with the outer edge of said flight of said screw conveyor.

6. A conveying apparatus comprising a cylindrical housing, a screw conveyor having a helical flight mounted longitudinally in said housing for rotational movement therein, a pair of spiraliform vanes having spiral impelling surfaces substantially parallel with the axis of the screw conveyor and fixed to the discharge end of said screw conveyor for rotational movement therewith, the spiraliform vanes beginning at diametrically opposed points near the center of said housing and terminating at diametrically opposed points substantially coextensive with the outer edge of said flight of said screw conveyor, and inclined surfaces having a pitch of the same hand as the pitch of the helical flight of said screw conveyor adjacent the impelling surfaces of said spiral vanes, whereby said inclined surfaces impart a forward movement to the particles conveyed toward the center of said apparatus by said spiraliform vanes.

7. A conveyor comprising a cylindrical housing, a screw conveyor longitudinally disposed in said housing and mounted for rotation therein, a member fixed on the discharge end of said screw and rotatable therewith, a spiraliform vane having its base on said member with an inner spiral impelling surface substantially parallel with the axis of the screw conveyor for impelling inwardly only a portion of the particles discharged by the screw conveyor, the spiraliform vane beginning near the center of said member and terminating at a point substantially coextensive with the outer edge of the flight of the screw conveyor, said member further having at the base of the inner impelling surface of said vane a pitched surface which is transverse to the axis of the screw conveyor and of the same hand as the hand of the pitch of said screw conveyor for imparting a forward impetus to the portion of particles conveyed inwardly by said spiral impelling surface.

References Cited in the file of this patent

UNITED STATES PATENTS

| 1,320,718 | Steinle | Nov. 4, 1919 |
| 1,534,008 | Bongardt | Apr. 14, 1925 |
| 1,630,361 | Stay et al. | May 31, 1927 |
| 2,595,210 | Clinefelter | Apr. 29, 1952 |